United States Patent [11] 3,623,802

| [72] | Inventor | Erwin Hubner<br>Wetzlar, Germany |
|---|---|---|
| [21] | Appl. No. | 807,368 |
| [22] | Filed | Mar. 14, 1969 |
| [45] | Patented | Nov. 30, 1971 |
| [73] | Assignee | Ernst Leitz GmbH<br>Wetzlar, Germany |
| [32] | Priority | Mar. 29, 1968 |
| [33] | | Germany |
| [31] | | P 17 72 094.4 |

[54] OVERHEAD PROJECTOR
9 Claims, 7 Drawing Figs.

[52] U.S. Cl. .................................................. 353/23,
353/63, 353/78, 353/99, 353/122
[51] Int. Cl. ............................................... G03b 1/48,
G03b 21/14, G03b 21/00
[50] Field of Search............................................ 353/23, 44,
77, 45, 78, 63, 64, 65, 66, 98, 99, 122; 352/57, 61,
69, 85, 244, 104

[56] References Cited
UNITED STATES PATENTS

| 2,813,455 | 11/1957 | Fitz Gerald | 353/99 |
| 3,357,300 | 12/1967 | Cornell | 353/45 |
| 3,488,115 | 1/1970 | Nemec et al. | 353/64 |
| 3,225,648 | 12/1965 | Toler | 353/64 |

*Primary Examiner*—Leonard Forman
*Assistant Examiner*—Steven L. Stephan
*Attorney*—Krafft & Wells ABSTRACT: In the image-forming bundle of light rays of an overhead projector at least one further objective is arranged in addition to the projecting objective, which further objective serves as an intermediate optical system. Reflecting means are provided in the path of the light rays; and the objectives and the reflecting means are mounted structurally separate from the table which carries the supporting plate for the writing foil so that the view for the writer and for the audience is not obstructed.

INVENTOR
Erwin Hübner
BY
Krafft & Wells
ATTORNEYS

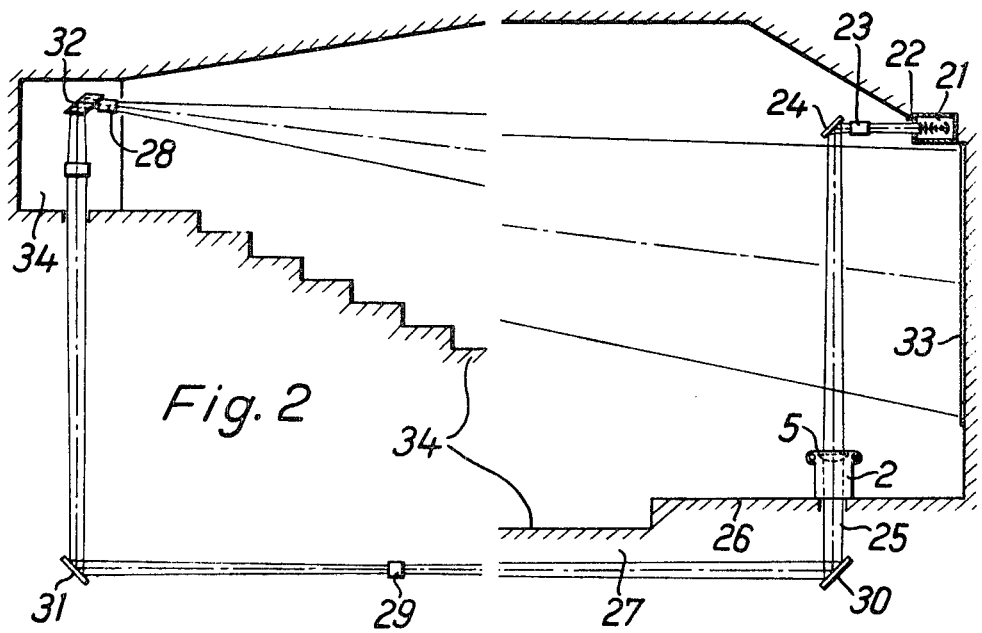
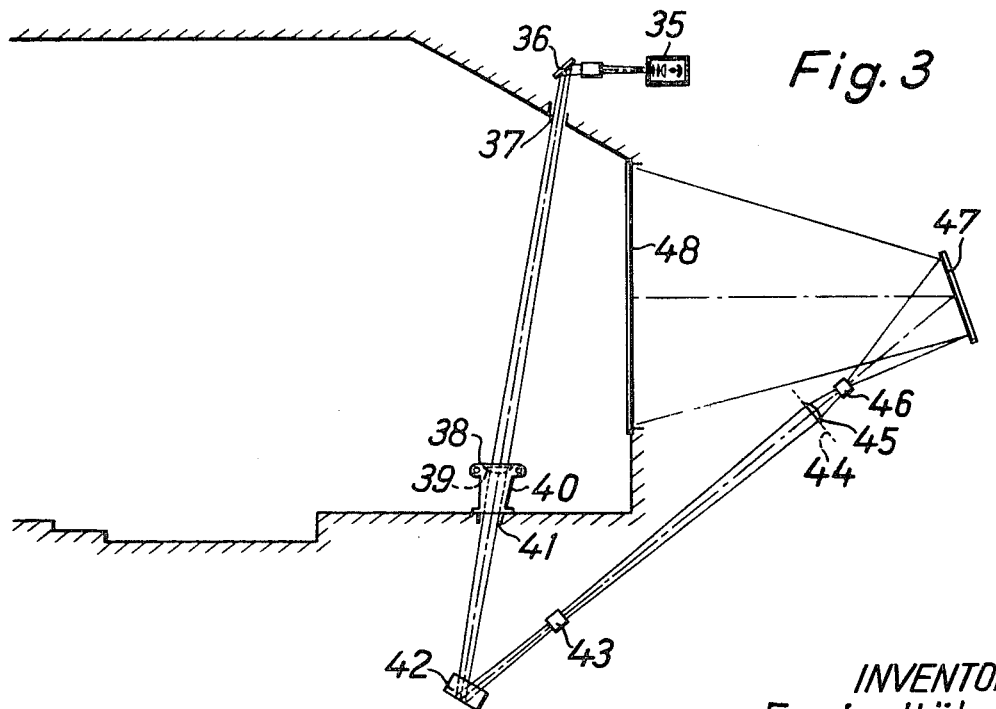

OVERHEAD PROJECTOR

CROSS-REFERENCE TO RELATED APPLICATIONS

Applicant claims priority under 35 USC 119 for application P 17 72 094.4 filed Mar. 29, 1968 in the Patent Office of the Federal Republic of Germany

BACKGROUND OF THE INVENTION

The present invention relates to an apparatus for projecting written characters or the like while they are being formed. Apparatuses of this type, so called overhead projectors, are known in which the lecturer can inscribe his notes on a transparent foil which is stretched over a likewise transparent support surface, i.e. a supporting plate. The supporting plate constitutes the top of a table frame in which is housed a light source arrangement. The projection objective associated with the apparatus is secured on a supporting arm hinged on the table frame and at the same time carrying a mirror to reflect the rays on to the screen which is disposed in an elevated position behind the writer.

However, these apparatuses have the disadvantage that the supporting arm with objective and mirror obstructs the view for both the lecturer and also the audience. Moreover, by reason of the considerable divergence between the axis of projection and the central perpendicular of the screen, the image which is projected appears to be distorted and partially ill-defined. Furthermore, it must be regarded as a disadvantage that the writing desk must be set up at a relatively considerable distance from the projection screen, near to or even in the midst of the front member of the audience, in order to obtain a sufficiently large projected image which can be easily seen and read by the back row of the auditorium.

Therefore, it is the object of the present invention to provide an overhead projector in which obstruction of view is eliminated, and it is another object of the invention to provide an overhead projector by which improved quality of the projected image and freedom from glare are achieved.

SUMMARY OF THE INVENTION

According to the present invention these objects are attained by arranging at least one more objective in addition to the projection objective in the path of the image forming light rays, which additional objective serves as an optical intermediate system. Further, reflecting means are disposed in the path of the light rays between the supporting plate and the projection screen. The reflecting means and intermediate system are structurally separate from the table which carries the supporting plate in a manner which permits complete unobscured vision both for the writer and for the audience. The overhead projector herein defined has the advantage that the optical elements (namely the projection objective, the intermediate system and the reflecting means) are situated in spaced relation along an optical path, and not as in previous arrangements mechanically supported by the table. In other words, there is no mechanical connection between individual optical elements which must naturally be aligned relative to one another. Consequently, the space above the supporting plate can remain free from obstructive members. In the preferred embodiments of the invention the light source is remote from the table. Preferably the optical elements for the image-producing rays can be disposed in the vicinity of the ceiling and secured there by means of corresponding ceiling brackets. Alternatively, these assemblies can be accommodated outside the room, and it is then required to have apertures in the ceiling and/or in the floor.

All these arrangements make it possible for the writing desk to be set up at a more favorable location on the experimenting platform immediately in front of the screen. By virtue of their considerable object distance which may be of the same order as the height of the room the objective lenses have correspondingly long focal lengths. This provides the further advantage that the field lenses disposed in the object or intermediate image plane, may likewise have long focal lengths, which favorably affects the quality of reproduction.

In order to ensure that reflecting means e.g. mirrors provided for lateral and vertically correct reflection of the rays do not have to be unnecessarily large and also in order to keep the costs of the other optical elements as low as possible, an intermediate system is chosen which reproduces the image on a scale in the order of 1:1. This also has the advantage of achieving considerable sharpness of definition so that no secondary focusing is required if, in order to achieve the desired working height, the object support surface is disposed in an axial direction.

Furthermore, it is proposed to incline the rays passing through the supporting plate, particularly if the light source arrangement is situated above the supporting plate, through a few degrees, so that a glare-free area is produced on the side towards the writer.

According to a further feature of the invention a lens is associated with the light source arrangement which comprises an auxiliary mirror and condenser. However, a complete projector with a framing device to hold transparencies may be provided as the light source arrangement. In this way, the intermediate image frame in which a field lens must be disposed in known manner, situated in the direction of rays in front of the object plane, can serve at the same time as an additional object supporting surface. For example, it is possible to introduce a transparency which is shown reproduced in the actual object plane (supporting plate). It then serves equally well as means of supplementing the handwritten notes. For this purpose, so that the transparency image shall be sufficiently recognizable in the writing plane, the arrangement must be supplemented by suitable measures, such as for example enlargement of the dispersion factor of the writing foil. On the other hand, however, this measure has the advantage that the radiation intensity of the rays depicting the writing area is reduced.

The apparatus can be so combined with an episcope of known design that one of the intermediate image planes lies in the region of the episcope. Thus, it becomes possible to utilize the reproduction system of an episcope for the purpose of projecting written characters while they are being formed.

According to a further feature of the invention, the table frame which houses the light source arrangements, is constructed as a movable component and furthermore the optical elements disposed above the writing foil, in the vicinity of the ceiling of the room, are so combined with control means that upon displacement of the table frame, the alignment of the optical parts automatically follows.

DESCRIPTION OF THE DRAWINGS

The invention will be more readily comprehended from the following description when taken in conjunction with the appending drawings, wherein:

FIG. 2 shows an equivalent arrangement in which the image-reproducing rays are projected underneath the seats and parts of the image-reproducing system are accommodated in a cubicle;

FIG. 3 shows an arrangement with transparent projection and the lighting and image-reproducing system disposed outside the room;

DESCRIPTION OF THE PREFERRED EMBODIMENTS

Figure 1:
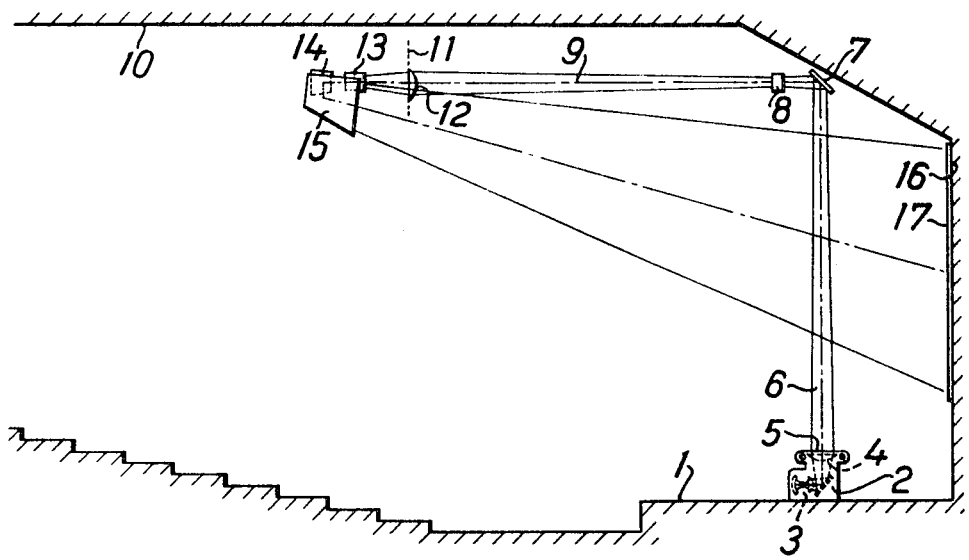
FIG. 1 shows an auditorium projection arrangement with the reproducing system disposed underneath the ceiling.

The table frame 2 rigidly mounted on the platform 1 is constructed in the manner of a conventional overhead projector, but with no lens-holding arm. It contains the light source assembly 3 and the writing foil 5 which is situated above the field lens 4 used as a supporting plate. The beam of rays 6 passing through the writing foil is guided by a reflecting mirror 7 mounted on the ceiling, to the objective 8 which acts as an intermediate system and the axis 9 of which extends approximately parallel with the ceiling 10. According to the distance from the writing foil 5 (object field) this objective lens has a focal length of 3,600 mm. It depicts the object in the intermediate image plane 11 in which the field lens 12 is located. The objective lens 13 is disposed subsequently in the direction of light travel and, having a focal length of 800 mm., throws an enlarged image of this intermediate plane on to the screen 17 mounted on the auditorium wall 16, after the rays have been twice reflected by the mirrors 14 and 15 (FIG. 1a). The optical elements 8, 12, 13, 14 and 15 are, in the same way as the reflecting mirror 7, secured to the ceiling by holding means which are, however, not illustrated for reasons of clarity.

Figure 1A:
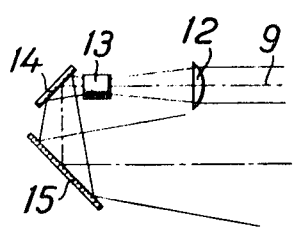
FIG. 1a shows in a plan view, on an enlarged scale the reflecting means shown in the path of image rays according to FIG. 1.
Figure 1B:
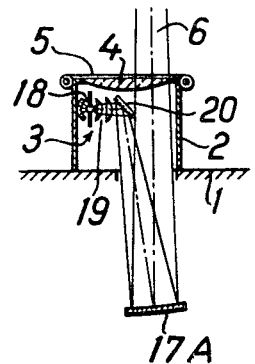
FIG. 1b shows modification to the lighting arrangement shown in FIG. 1, likewise on an enlarged scale.

Instead of the light source assembly shown in FIG. 1, it is also possible to use the arrangement shown in FIG. 1b. Essentially, this differs from the embodiment according to FIG. 1 by the incorporation of an ellipsoid mirror 17A which renders the working area reflection free when viewed from the place occupied by the lecturer. 18 is the light source, a xenon lamp, and 19 the condenser, while reference numeral 20 denotes a reflecting mirror.

According to the embodiment shown in FIG. 2, the light source arrangement is above the table frame 2, in the vicinity of the room ceiling. It consists of a lamphouse 21, which can be accommodated inside the room but also, as shown, outside the room which is then provided with an appropriated aperture 22 through which the rays can pass, and also a collecting member 23 and a reflecting mirror 24. The element 23 which is preferably constructed as an objective lens, can also be incorporated with the lamphouse to form one unit which then functions in the manner of a projector of conventional type.

The image-reproducing ray 25 passes through the floor 26 and extends underneath the seat 27. The optical path length to the projection objective lens 28 is bridged by an intermediate system 29 which, as in the aforesaid example, has a relatively long focal length. The rays are reflected by the mirrors 30, 31 and 32, of which the latter, in the same way as the lens 28, is accommodated in a cubicle 34 disposed opposite the image screen 33.

In the example according to FIG. 3 the light source assembly 35 is likewise disposed above the table frame, outside of the room. The angle of inclination of the reflecting mirror 36 associated with the light source arrangement is so chosen that the rays passing through the aperture 37 fall obliquely on to the object 38. This ensures the desired freedom from glare for the lecturer.

The rays penetrating the object 38 and the field lens 39 are fed through a floor aperture 41 underneath the table frame 40 to an angled mirror 42 which reflects them towards the objective lens 43 which reproduces the image to a scale of 1:1. The field lens 45 which is followed by the objective lens 46, is located in the intermediate image plane 44 of the objective lens 43. The axes of both objective lenses are so aligned that for functional purposes they are situated at right angles to the plane of the object 38. Consequently, the distortion produced by reason of the oblique approach of the lighting rays is compensated. 47 denotes a mirror which reflects the rays in the direction of the (in this case) transparent image screen 48 (back projection).

Figure 4:
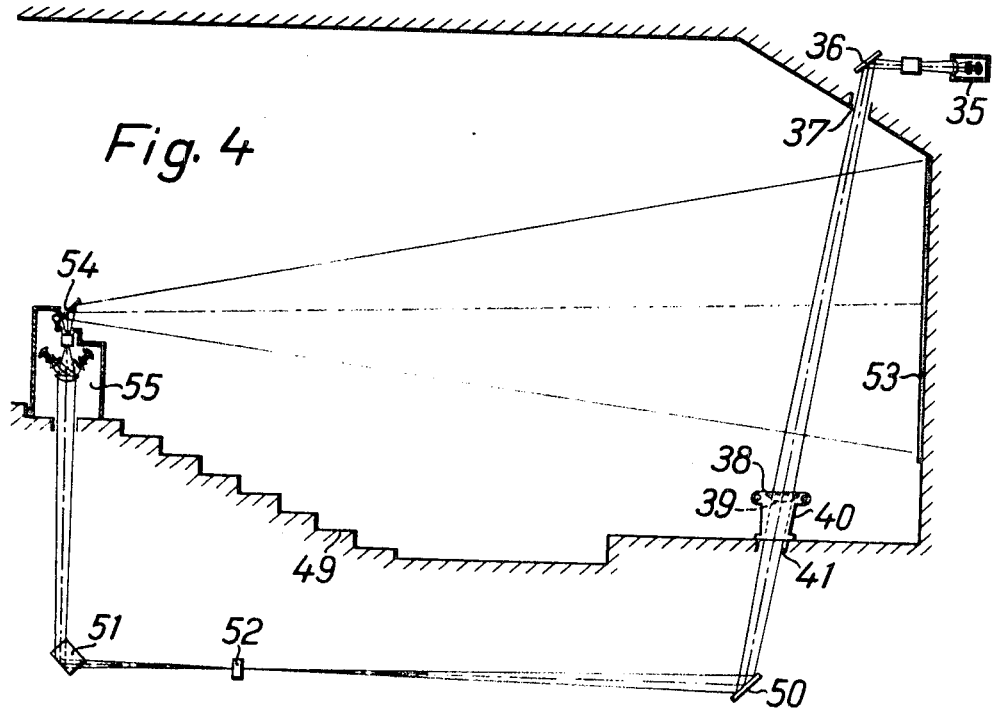
FIG. 4 shows an arrangement in which the image-reproducing rays are passed through an episcope.

According to the embodiment shown in FIG. 4, the same arrangement is provided on the lighting side. Mirrors 50, 51 and the intermediate system 52, are located in the path of the image-reproducing rays, which are guided underneath the seats 49. The rays are reflected into the direction of the image screen 53 by means of the mirror 54, with which an episcope 55 of conventional type is associated. Consequently, using the light source assembly of the written material projecting outfit, the episcope 55 can also be used as a diascope.

Figure 5:
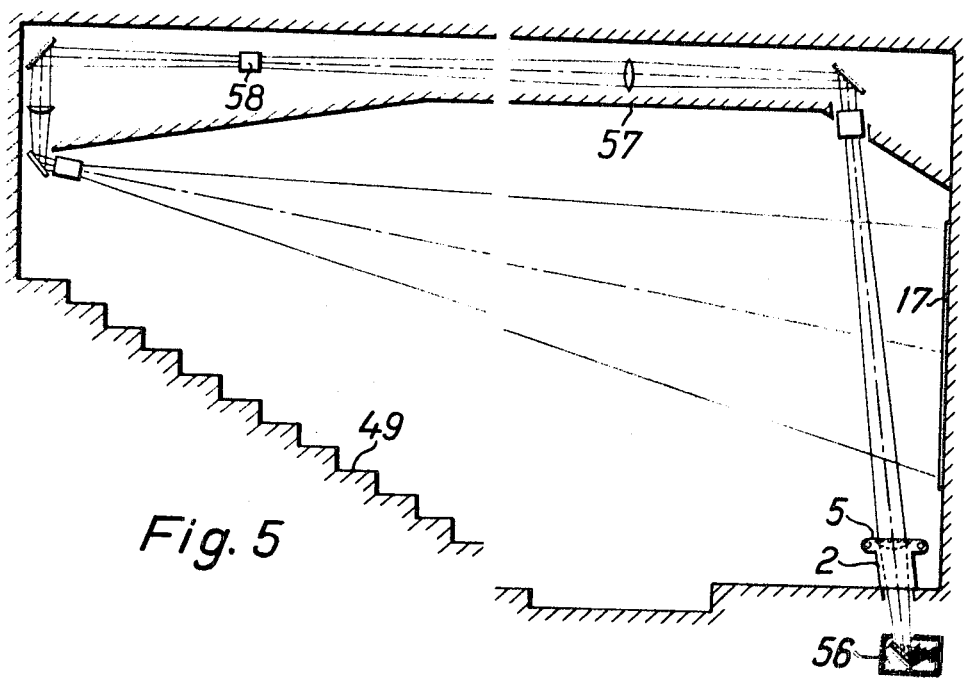
FIG. 5 shows an arrangement with the rays guided over an intermediate ceiling.

A further example is shown in FIG. 5. In this case the light source assembly 56 is again situated underneath the table frame, while the image-reproducing rays are passed through a space above the false ceiling. The desired freedom from glare is guaranteed by the oblique incidence of the lighting rays. For the written characters to be depicted unreversed and upright, however, a second intermediate image reproduction is required, by means of the objective lens 58.

What is claimed is:

1. A projection system for use in a room bounded by walls, a floor and a ceiling, a platform located at one end of said room, a projection screen mounted on the wall adjacent said platform, image-forming means including a supporting plate, a writing foil disposed above said supporting plate, said image-forming means being located on said platform adjacent said projection screen for projection therethrough onto said screen of an image on said image-forming means, said projection system comprising in combination means for illuminating including a light source arranged on one side of said writing foil, a first objective for projecting arranged on the other side of said writing foil, the rays from said light source passing through said writing foil and as image-forming rays through said first objective, a second objective disposed between said first objective and said writing foil in the path of the image-forming rays, said second objective serving as an intermediate system by producing an intermediate image plane, at least one of said objectives being located outside the bounds of said room, at least one of said walls, floor or ceiling having apertures in the path of said image-forming rays whereby the image-forming rays pass through the apertures, and reflecting means disposed in the path of the image-forming rays between the writing foil and said projection screen.

2. The projection system as defined in claim 1, wherein said objectives have an object distance of the same order as the height of the ceiling from the floor of said room and therefore have a correspondingly long focal distance.

3. The projection system of claim 1, wherein said second objective is arranged to produce an image of said writing foil into said intermediate image plane, the image in said intermediate plane and said writing foil having a ratio in relation to their dimensions of 1:1.

4. The projection system of claim 1, wherein at least one of said objectives in the path of said imaging rays is disposed in the vicinity of the ceiling of the room.

5. The projection system of claim 1, wherein said image-forming means includes holding means for holding transparent slides.

6. The projection system as defined in claim 1, wherein said means for illuminating is disposed above the supporting plate for the writing foil at such an angle that the optical axis of the rays passing through said supporting plate in inclined with respect to said supporting plate so as to produce a glare-free zone facing the writer.

7. The projection system as defined in claim 1, and further comprising an objective incorporated in said means for illuminating in addition to the light source, a mirror and a condenser lens.

8. The projection system as defined in claim 1, wherein in the image plane of one of said objectives, a field lens is disposed, said field lens serving as an additional object support surface.

9. The projection system as defined in claim 1, wherein an episcope is disposed in one of said intermediate image planes and all objectives lenses are aligned.

* * * * *